(No Model.)
B. E. BLAKESLEE.
HEADWAY AND LEEWAY INDICATOR FOR VESSELS.
No. 290,840. Patented Dec. 25, 1883.
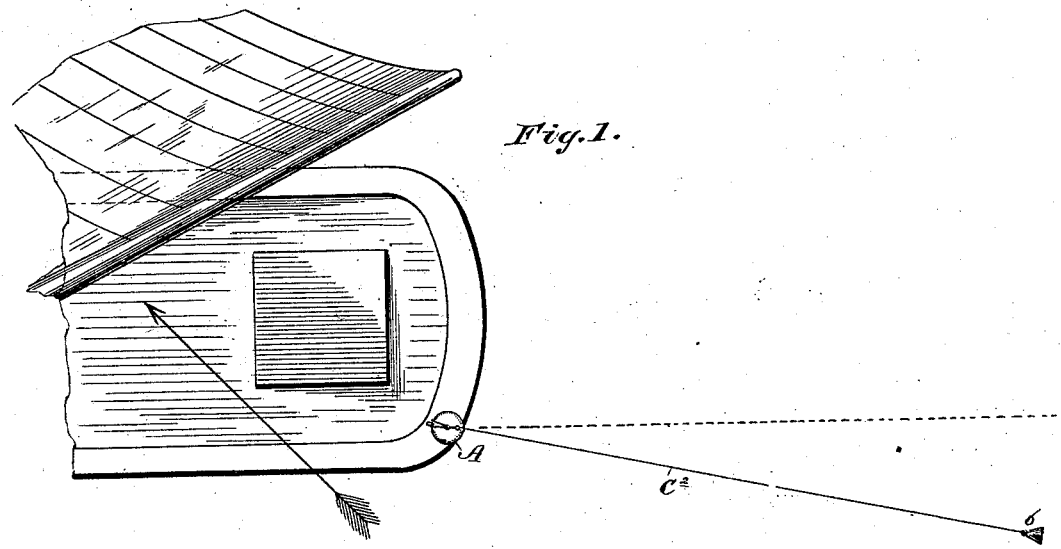
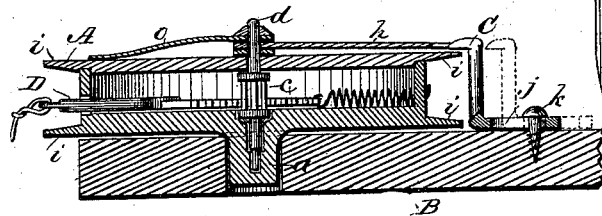
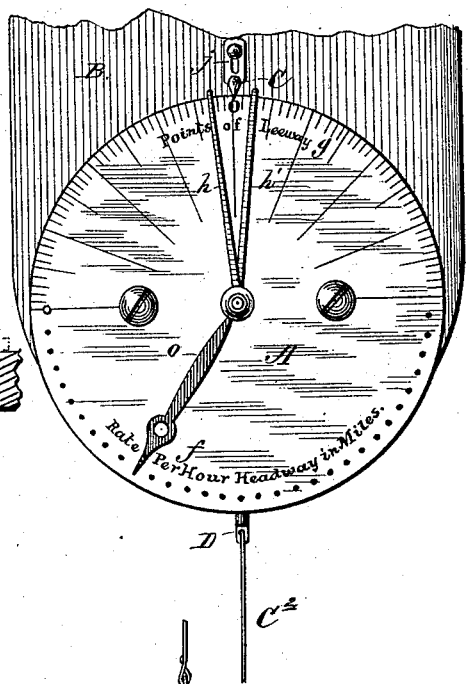
WITNESSES:
INVENTOR:
B. E. Blakeslee
BY
ATTORNEYS.

UNITED STATES PATENT OFFICE.

BURTON E. BLAKESLEE, OF CAMBRIDGE, MARYLAND, ASSIGNOR TO REBECCA H. BLAKESLEE, J. HOOPER SHEPHERD, AND SAMUEL T. RICHARDSON, ALL OF SAME PLACE.

HEADWAY AND LEEWAY INDICATOR FOR VESSELS.

SPECIFICATION forming part of Letters Patent No. 290,840, dated December 25, 1883.

Application filed April 16, 1881. (No model.)

*To all whom it may concern:*

Be it known that I, BURTON E. BLAKESLEE, of Cambridge, Dorchester county, State of Maryland, have invented a new and useful Improved Headway and Leeway Indicator for Vessels; and I do hereby declare that the following is a full, clear, and exact description of the same, reference being had to the accompanying drawings, forming part of this specification, in which—

Figure 1 is a view of the device applied to the rear end of a vessel, the arrow serving to indicate the direction of the wind, and the angle of the log-line indicating the leeway. Fig. 2 is a vertical central section, and Fig. 3 a plan view of the device on an enlarged scale.

The object of my invention is to provide a device for use on vessels which shall indicate the headway or rate of speed, the leeway or lateral drift, and the maximum amount of the latter. A device for practically accomplishing this result has long been a desideratum, for the reason that it would be a valuable adjunct for determining the position of the vessel and avoiding danger at night or in a storm, as well as enabling a sailing-vessel to know how to sail to the best advantage. A device designed to accomplish this result has heretofore been made in which the tension of a small weighted ship's log drawn through the water behind the ship drew back a spring-held bar which was provided with rack-teeth and turned a pinion carrying an index-hand, the speed being indicated in direct ratio to the resistance of this log and the distance the index-hand was turned, and in which device, also, the arm to which the log-line was attached was made to turn about the center of the case without turning the case, and indicated on another scale the leeway by swinging horizontally, the log or drag being submerged and not subject to drift or leeway, which, it will be seen, furnishes the conditions for measuring the drift or leeway of the vessel.

My invention, which is based upon the foregoing general principle, relates more particularly to the devices for indicating the leeway; and it consists in pivoting the whole case upon its center and combining it with a relatively stationary pointer, so that the scale-indicating leeway moves about the pointer.

The invention also consists in combining with the centrally-pivoted case and the stationary pointer a pair of loose hands forming dead-points or markers for indicating the maximum leeway on either side, and also, further, in constructing the case with peripheral flanges, which form a spool or reel that, in connection with its central pivot, permits the log-line to be wound up on the same, all as hereinafter more fully described.

In the drawings, A represents the case, which is mounted by a central pivot, $a$, upon a plate or board, B, which latter is bolted or otherwise fastened to the taffrail of the vessel. $C^2$ is the log-line, made of wire or strong twine, about two hundred and fifty feet long, and carrying a weighted ship's log, $b$, at its end, which is to be thrown overboard. The forward end of the line is made fast to a bar, D, held forward by a spring, and having a set of rack-teeth, which engage with a pinion, $c$, on a small central shaft, $d$, that carries an index-hand, $o$, which, from the varying tension of the log in the water, due to different rates of speed, moves over the scale $f$ on the outside of case, and indicates thereon the rate of speed per hour in a manner already known.

Now, to indicate the leeway, it will be seen that the weighted log, being submerged in the water, is not affected by the wind and waves, and as the vessel is thus affected it will be obvious that the log $b$ will not trail directly behind the vessel, as indicated by the dotted line, Fig. 1, but will extend out at an angle to the longitudinal axis of the vessel. This angle measures the leeway and increases as the leeway or drift increases. Now, to record or indicate it, the whole case A is mounted upon the central pivot, and a relative stationary pointer, C, is fixed to plate B, which, as the case turns horizontally, indicates the amount of leeway marked on the scale $g$ on said case, the leeway being indicated upon one side or the other, according as the vessel is on the starboard or port tack. This making of the entire case to turn horizontally on its center I consider a feature of great merit, for it reduces the friction to a minimum and allows the leeway to be much more sensitively indicated. It has also another advantage, in that it permits me to place two loose hands, $h\ h'$, on the face of the case, which rest upon opposite sides of the stationary pointer C, and indicate the maximum leeway, for when the case is turned the pointer C holds one of the hands and allows the scale to pass under same until the extreme leeway is indicated, and then when the axis is turned back this hand remains where it was in relation to the scale— i. e., it moves back with the case and permanently rests above the indication marking the greatest leeway. One of these hands marks the maximum leeway for one tack and the other for the other. Another great advantage which the pivoting of the case has is, that it permits the case to be used as a reel or spool for winding up the log-line, and for this purpose the edge of the case is provided with two flanges, $i\ i$, which form a deep peripheral groove between, that gives room for the coils of the log-line while it is being wound up by turning the case on its center. To permit this to be the better accomplished, the normally stationary pointer C is made with a slotted base, $j$, and a set-screw, $k$, provided, whereby the pointer may be withdrawn from the periphery of the case and held in that position by the set-screw.

If desired, the whole device as thus described may be placed in a case having a glass face.

In defining more clearly that part of my invention which indicates the maximum leeway, I would state that I am aware that the two hands or dead-points have heretofore been used for analogous purpose—for instance, in rotary thermometers, where the expansion and contraction of a coil-spring moved a hand, and this hand, in its movement, struck against and moved one or the other of two hands, one of which indicated the maximum and the other the minimum temperature. My devices differ from these, in that the hands or dead-points are supported upon the surface of the case, and are moved over the graduated face of the same by the resistance which a relatively stationary pointer affords, and then, when the case moves in the other direction, the hand moves with the case away from the pointer. The advantage of this is, that the hands remain just where they lay on the case, and the liability of each hand to be disturbed by the movement of the other hand is entirely avoided.

Having thus described my invention, what I claim as new is—

1. The device herein described for indicating headway and leeway of vessels, consisting of a relatively stationary pointer, a circular and centrally-pivoted case having a scale thereon, and a log and log-line connected with the case and adapted to turn the same bodily, substantially as described.

2. The combination, with a relatively stationary pointer, C, and the centrally-pivoted case having a scale thereon, as described, of two loose hands arranged on the center shaft of the case, and resting one upon each side of the stationary pointer, and a log-line and log adapted to move the case on its pivot to indicate the leeway, as described.

3. A case provided with devices for indicating headway or leeway of vessels, constructed with flanges at its edges to form a peripheral groove or channel, combined with the log-line, and adapted to receive the coils of the same, as described.

4. A centrally-pivoted circular case provided with devices for indicating headway or leeway of vessels, constructed with flanges at its edges to form a peripheral groove or channel, combined with the log-line and adapted to receive the coils of the same, as described.

5. The combination, with the circular case A, having a central pivot and a leeway-scale on its face, of the relatively stationary pointer C, having an adjustable connection with the base-plate, substantially as and for the purpose described.

BURTON E. BLAKESLEE.

Witnesses:
  H. R. MOBRAY,
  JOSEPH HY. HOOPER.